United States Patent [19]
Grusin

[11] Patent Number: 5,373,779
[45] Date of Patent: Dec. 20, 1994

[54] YOGURT CHEESE MAKING DEVICE

[76] Inventor: Gerald Grusin, 640 N. LaSalle Dr., Chicago, Ill. 60610

[21] Appl. No.: 176,326

[22] Filed: Jan. 3, 1994

[51] Int. Cl.$^5$ ............ A01J 25/11; B01D 23/28
[52] U.S. Cl. .................. 99/458; 99/456; 99/496; 210/469; 210/474; 210/513; 210/532.1
[58] Field of Search ............... 99/495, 496, 452, 456, 99/458, 459; 210/464, 481, 469, 478, 474, 479, 513, 514, 521, 532.1; 141/364, 331, 375; 220/532; 426/34, 36, 43, 491

[56] References Cited

U.S. PATENT DOCUMENTS

| | | | |
|---|---|---|---|
| 658,923 | 10/1900 | Pifer | 210/474 |
| 1,976,549 | 10/1934 | Foose | 210/464 |
| 2,575,768 | 11/1951 | Pearsall | 210/513 |
| 4,003,490 | 1/1977 | Corbic | 210/521 |
| 4,291,064 | 9/1981 | Retzlaff | 99/458 |
| 4,560,475 | 12/1985 | Kataoka | 99/323 |
| 4,680,117 | 7/1987 | Freeman | 99/496 |
| 4,804,470 | 2/1989 | Calvillo et al. | 210/469 |
| 5,065,671 | 11/1991 | Tameris | 99/456 |
| 5,219,006 | 6/1993 | Bishop | 141/331 |
| 5,297,476 | 3/1994 | Garland et al. | 99/456 |

FOREIGN PATENT DOCUMENTS

| | | | |
|---|---|---|---|
| 1209796 | 4/1965 | Germany | 99/458 |
| 4102415 | 4/1992 | Japan | 210/464 |
| 8301268 | 4/1983 | WIPO | 210/514 |

*Primary Examiner*—Timothy F. Simone
*Attorney, Agent, or Firm*—Knechtel, Demeur & Samlan

[57] ABSTRACT

A yogurt cheese making device for separating the whey from yogurt having a strainer which receives the yogurt, the strainer having an open top, a bottom, a pair of opposing end walls, and a pair of opposing side walls. The side walls and bottom are covered with a straining medium which is a wire mesh. The wire mesh is disposed at a 45° angle with respect to the vertical to assist in drainage. The bottom of the strainer is defined by a pair of parallel straining troughs. The strainer is nested in a sealable container which has a sealing top. Whey from the yogurt seeps through the straining medium and is collected at the bottom of the sealable container. The entire device is preferably square or rectangular in shape to minimize the storage area required in a refrigerator.

17 Claims, 3 Drawing Sheets

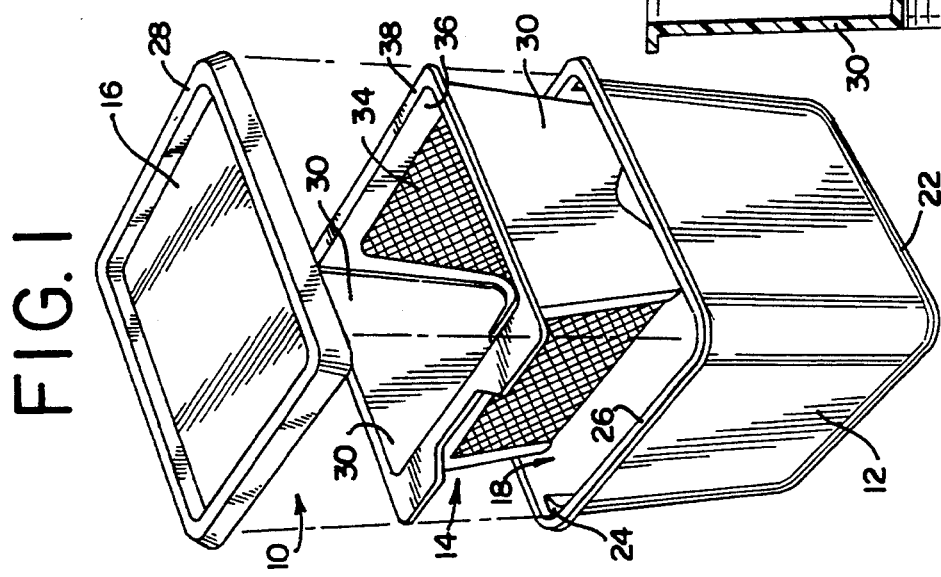
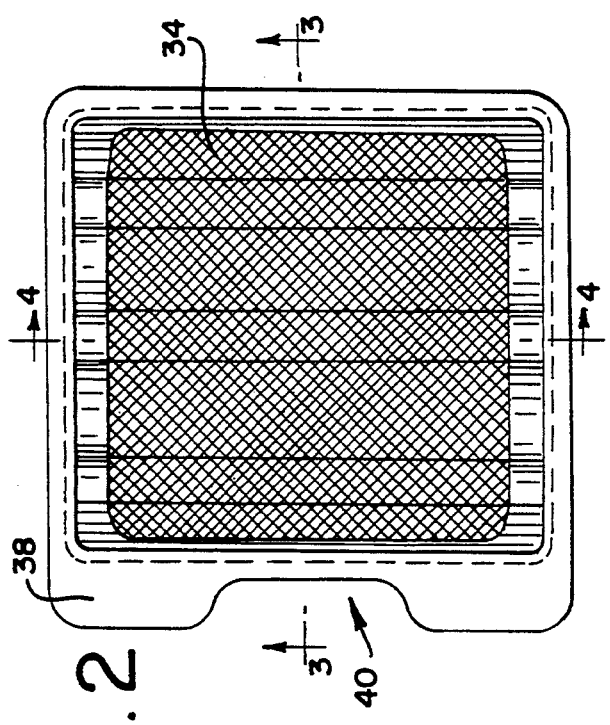
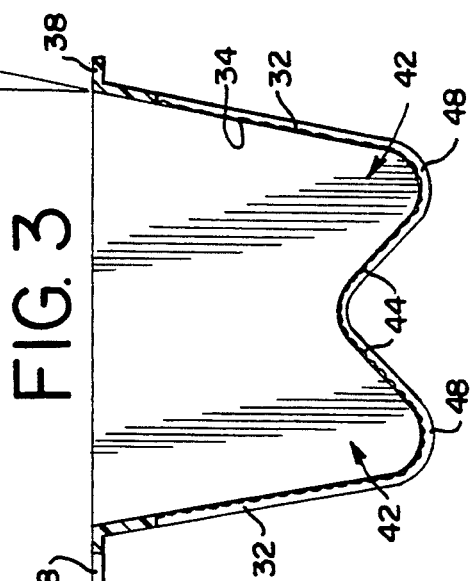
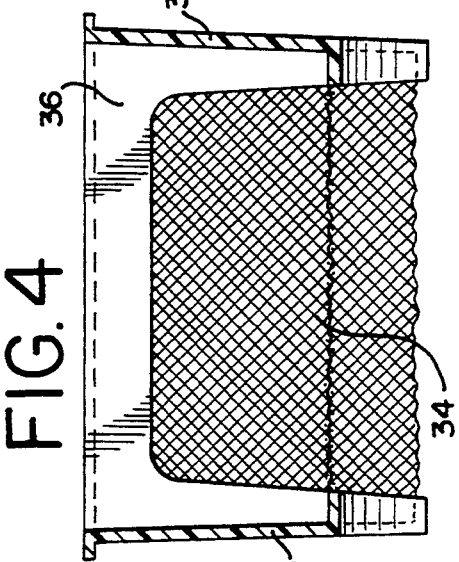

YOGURT CHEESE MAKING DEVICE

BACKGROUND AND SUMMARY OF THE INVENTION

This invention relates to a yogurt cheese maker and, more particularly, to a device used for separating the whey from yogurt.

Recently, there has been growing interest of consumers in low-fat foods. In surveys conducted by the Food Marketing Institute, it was found that forty-six percent (46%) of consumers spontaneously listed fat content as their primary nutritional concern in 1990, as compared to only nine percent (9%) in 1983. During the same time, sales of yogurt have substantially increased. A derivative of yogurt is yogurt cheese also called yogurt cream cheese.

By removing the whey, which is the liquid portion of yogurt, from the curd, a cheese-like food is formed which has a consistency comparable to that of cream cheese. This product is nutritious yet low in fat, cholesterol, calories and sodium and is gaining far wider use today in North America and Europe in numerous recipes as a substitute for cream cheese, sour cream and mayonnaise.

Furthermore, yogurt cheese can be used by people who are allergic to lactose (milk sugar) because most of the lactose found in yogurt is removed in the cheese-making process. For the same reason, yogurt cheese has even less calories than the yogurt from which it is made. Yogurt cheese is made by draining off the whey while retaining the coagulated particles (curds) which is a relatively simple process that takes up to twenty four (24) hours depending on the firmness of the cheese desired. In the past, several types of processes and apparatus have been used to remove the whey. Generally, these include the use of either cheese cloth or similar straining material to form a filter element upon which the yogurt is placed. The whey slowly drains into a colander or strainer leaving the desired cheese which is then removed from the cloth filter. Another method is to use a coffee filter, white paper towel or a fine sieve as the straining medium. The straining medium is placed in a colander, large strainer or sieve to give the strainer structural support. The whey is collected in a bowl of some sort which is below the colander.

One of the drawbacks with cheese cloth is that the yogurt adheres to the cloth fibers making it difficult to remove the residue. Also, the cloth must be thoroughly washed or discarded after use, as cheese cloth cannot be scraped clean. It is difficult to assemble all of these items in a complete, simple and easy-to-use device which can be easily stored in a refrigerator. Furthermore, if these elements are not properly chosen, they take up an inordinate amount of space in the refrigerator and will very likely be unstable and may spill.

An example of one device is shown in U.S. Pat. No. 4,680,117. This patent discloses a yogurt separator which uses a flat blank of filter mesh made of synthetic resin. The blank is formed into a cone. The cone receives the yogurt which is held in the cone until the whey drips through the filter mesh and out of the bottom. A major problem with this device is that the curds collect toward the bottom of the cone, where the area of filter mesh exposed to the curd is reduced, making it more difficult for the whey to drain. This increases the time needed for the whey to drain and decreases the overall efficiency of the device.

Applicant's invention overcomes the disadvantages apparent in the prior art devices. Applicant's device provides a yogurt cheese device which separates the whey from yogurt using a unique and improved strainer. Generally, the strainer is configured having a pair of opposing side walls which are covered with a straining medium such as stainless steel mesh. The bottom of the strainer has a pair of two parallel straining troughs, each straining trough having one side connected to one of the side walls and the other side connected to the other straining trough. The straining troughs are also formed from a mesh made of the steel filaments. The filaments are preferably oriented at an angle of 45° with respect to the vertical to improve the straining of the whey from the yogurt. There is an outer sealable container which receives the strainer. A cover is adapted to be received by the top of the outer sealable container when the strainer is nested within the container. The strainer is held within the outer sealable container such that the bottom of the strainer is above the bottom of the container at a height sufficient to allow the whey to drain without coming into contact with the bottom of the strainer. When the cover is placed over the sealable container top, it minimizes the likelihood of contamination of the yogurt and keeps the odors from the yogurt or foods in the refrigerator from transferring between themselves. Furthermore, a substantially square design of the yogurt cheese device provides for a minimum amount of storage space in the refrigerator as compared to other devices.

OBJECTS AND ADVANTAGES

It is an object of the present invention to provide an improved yogurt cheese maker which has an improved strainer which can be easily removed, cleaned and re-used. Another object is to provide such a yogurt cheese maker with a strainer formed of two parallel straining troughs which provides for increased straining area and decreased straining time.

Yet another object is to provide a yogurt cheese maker of substantially square configuration to minimize the storage space required in a refrigerator.

Yet another object is to provide a self-contained yogurt cheese maker having a straining device nested within an outer container and a sealable cover which fits over the container to prevent contamination of the yogurt during straining and, further, to minimize the transfer of odors between the yogurt and foods contained in the refrigerator.

Still another object is the object of providing an improved straining medium in the yogurt strainer whereby the straining medium is oriented at forty-five degrees with respect to the vertical to improve drainage of the whey from the yogurt.

BRIEF DESCRIPTION OF THE DRAWINGS

FIG. 1 is an exploded perspective view of the inventive yogurt cheese maker showing the outer container, strainer and sealable top.

FIG. 2 is a top view of the strainer.

FIG. 3 is a cross-sectional view taken along line 3—3 of FIG. 2 showing the "W"-shape cross section of the strainer.

FIG. 4 is a cross-sectional view taken along line 4—4 of FIG. 2 showing one of the strainer's side walls.

DESCRIPTION OF THE PREFERRED EMBODIMENT

Figure 5:
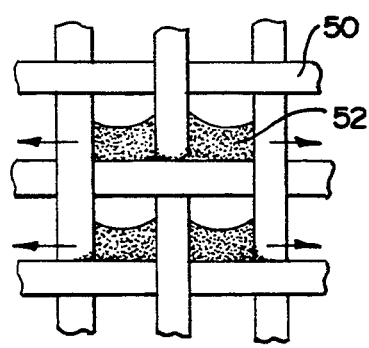
FIG. 5 is an enlarged view with portions removed of the orientation of the mesh of a conventional strainer.

In order for whey to drain within the yogurt, it must move between granules or globules of curd. As whey drains away, these interstices narrow and virtually disappear, finally allowing the curd granules to press against one another.

When yogurt is placed in a strainer, some curd granules are forced against the strainer screen and a small, insignificant number of smaller granules will pass through. These are quickly replaced by larger granules which are retained against the screen. Thereafter, whey does not have free passage through the full openness of the screen, but can only advance through interstices formed between curd granules pressing against the screen and the screen itself. As a result of these conditions, the drainage of whey is not a flow but a seepage, and it is, therefore, strongly influenced by surface tension and capillary action.

Surface tension is a molecular-level force that causes the surface film of a liquid, such as whey, to bring its contained volume into a form having the least surface area, theoretically a sphere, but, more realistically, a globule. Capillary attraction and capillary repulsion are two effects of surface tension on a liquid that is in contact with a solid surface such as the mesh wires of the strainer. When a liquid such as whey is inside the solid walls of a tubular configuration, such as the open spaces of the strainer mesh, these capillary actions cause the liquid to form either a concave surface when the containing walls are wetted, or a convex surface when the containing walls are dry.

Any drainage process depends primarily on the force of gravity. Nevertheless, the efficiency of a yogurt draining process, in addition, depends to a great extent on the reduction of certain counter-acting forces caused by surface tension and capillary action.

Drainage begins when whey is drawn into the dry-screen openings through capillary attraction. Once filled, no additional whey can be absorbed by these screen openings until the previously absorbed whey is induced to overcome surface tension or capillary attraction and advance to the outside surface of the screen. This process will be impeded if the whey does not move rapidly down the outside walls of the strainer and drip off of the bottom. Thus, the more vertical the walls, the more efficiently whey is removed. In view of the proceeding explanation, we now turn to the drawings to fully describe Applicant's invention.

Turning first to FIG. 1, there is illustrated the inventive yogurt straining device 10 which is comprised of an outer-sealable container 12, a strainer 14 and a cover 16. As can be seen in FIG. 1, the strainer 14 nests within the container 12 and the cover 16 seals the entire device. The outer sealable container has an open top 18, a closed bottom 20 and four side walls 22. In the embodiment shown in FIG. 1, the container 12 has side walls 22 of equal width thereby defining a square container. There is also a shoulder 24 molded into the container just below the top 18. A sealing edge 26 extends around the perimeter of the open top 18. The cover 16 has a sealing flap 28 extending around its perimeter. The sealing flap 28 extends around and over the sealing edge 26 to close the container 12.

The strainer 14 is clearly illustrated in FIGS. 2, 3 and 4. There are a pair of opposing end walls 30 which are preferably made of plastic and easily washable. Adjacent the end walls 30 and opposite each other are a pair of side walls 32. Each of the side walls 32 has a substantial portion of them covered with a strainer medium 34 preferably stainless steel wire cloth of a standard plain-square weave. The strainer 14 is formed from a plastic frame 36 which can be molded in combination with the end walls 30 and the strainer medium 34 embedded therein. A ledge 38 extends around the top perimeter of the strainer 14. The underside of the ledge 38 rests on the shoulder 24 of the container 12 when the strainer is nested within the container 12. As seen in FIG. 2, there is a finger indentation area 40 by which the user can easily grasp the ledge 38 to insert or remove the strainer 14 from the sealable container 12.

In FIGS. 3 and 4, it is seen that the side walls 32 have a substantial portion covered with the strainer medium 34. The strainer medium is held in place and in proper configuration by means of the plastic frame 36 which defines the shape and contour of the strainer medium 34. As seen in FIG. 3, there are a pair of parallel straining troughs 42 which run the length of the strainer 12. Each trough has inner side walls 44 which are joined together at an apex 46. A trough bottom 48 is the lower-most point of the strainer 14, and as can be seen in FIG. 3, the parallel straining troughs 42 define a generally "W"-shaped configuration when taken in cross section. Thus, it can be seen that each trough 42 is formed by one of the side walls 32 and an inner side wall 44 with the tops of the inner side walls joined at a apex 46. The strainer medium 34 can be one piece which defines the side walls 32, bottom 48, trough inner side walls 44 and apex 46. Thus, a singular piece of strainer medium can be preformed to create all of these elements and it can be molded into the plastic frame 36.

The specification of the strainer medium 34 can vary somewhat without affecting its performance; preferably, it should be in the range of approximately 0.016"×0.016" openings based on using 0.0085" diameter wire in a 40×40 per inch mesh count. Although stainless steel is the preferred strainer medium, other filaments such as nylon or other synthetics could be used.

Also, as seen in FIGS. 1 and 4, the overall height of the strainer 14 must be less than the height from the top of the shoulder 24 to the closed bottom 20. In this manner, when the strainer 14 is nested within the container 12, the bottoms 48 of the straining troughs 42 will be suspended above the bottom 20. Thus, as the whey is drained from the yogurt, it can collect in the closed bottom 20 while the yogurt is suspended above the collecting whey at all times.

As seen in FIG. 5, a conventional strainer has wire filaments 50 disposed at 90° with respect to each other. Furthermore, the wire filaments 50 are parallel to the horizontal and perpendicular to the vertical. As seen in FIG. 5, the liquid whey 52 will tend to rest on the wire filaments 50. The film of whey is drawn downward in the draining process, but it is immediately blocked from continuing downward past the horizontal wire filament 50 that forms the bottom side of each square opening. Instead, the whey 52 will move laterally, joining whey in adjacent openings until, finally, a globule coalesces that is large enough to overcome surface tension and flow downward, over and past the horizontal wires. This process is repeated at each horizontal wire, thus, impeding the drainage process.

Figure 6:
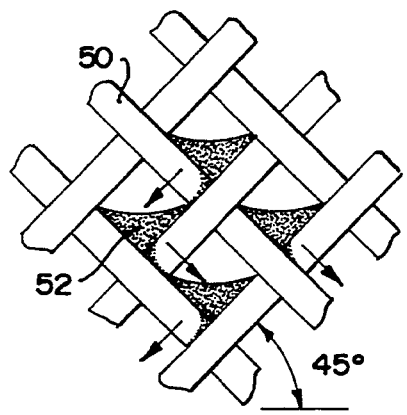
FIG. 6 is an enlarged view with portions removed of the orientation of the mesh in Applicant's inventive strainer.

In contrast, as shown in FIG. 6 of the invention, the identical plain-square weave screen is placed with its grid at a 45° angle with respect to the vertical. This provides two unique improvements in drainage efficiency. First, the film of whey within each screen opening is drawn into a triangular shape, a shape that offers the least resistance of downward flow. Second, the wire filaments 50, now being inclined, provide uninterrupted, gravity-assisted channels in which the whey in adjacent screen openings can join together to form large globules and flow rapidly downward. Another aspect of the strainer 14 is that the side walls 32 are very close to being vertical. In fact, the angle "A" in FIG. 3 should not be any greater than 15° and preferably as close to vertical as possible. In this way, the strainer medium 34 causes the whey to coalesce into large globules and causes the whey to run rapidly down the wire filaments 50 towards the bottom 48.

Figure 7:
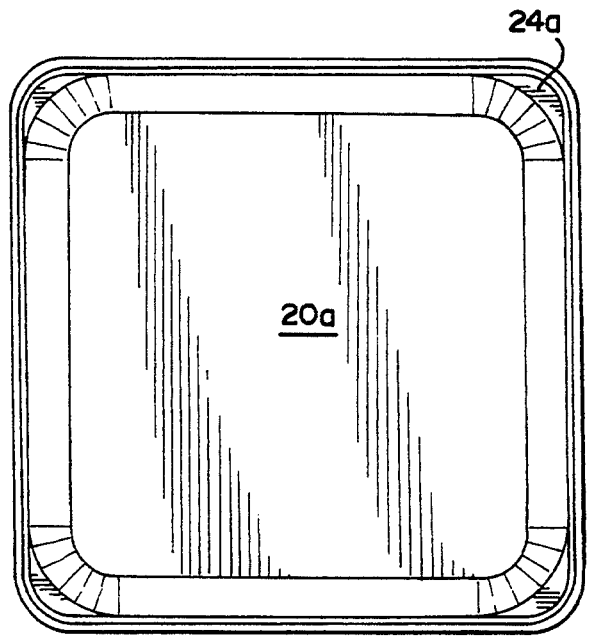
FIG. 7 is a top view of an alternate embodiment of the outer container with a flared lip to accept a different type of sealable top.
Figure 8:
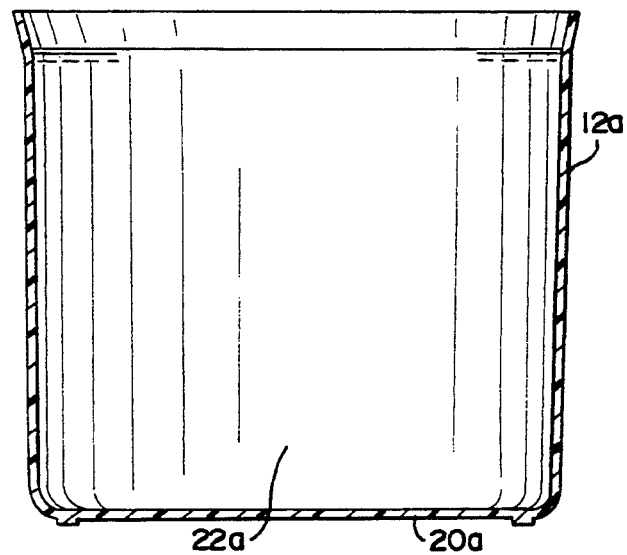
FIG. 8 is a side view of the alternate embodiment illustrated in FIG. 7.
Figure 9:
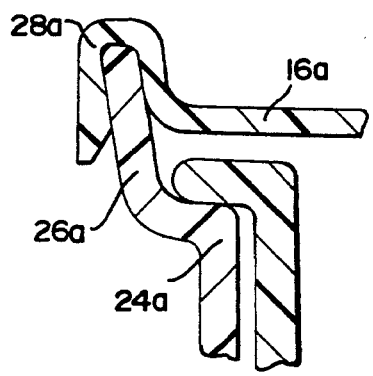
FIG. 9 is an enlarged cross-sectional view with portions removed of the alternate embodiment sealable top engaging the upper-most end of the side wall of the container and, further, showing how the top of the strainer is supported on a shoulder of the side wall.

An alternate embodiment of an outer-sealable container 12a is shown in FIGS. 7 and 8. The design is substantially similar to the first embodiment except that a sealing edge 26a, as shown in FIG. 9 is adapted to receive a different sealing flap 28a which engages the top of the sealing edge 26a. There is also a shoulder 24a at each corner which is adapted to receive the underside of the strainer ledge 38. Just as in the first embodiment, the overall height of the outer-sealable container 12a and the position of the shoulder 24a is such that the strainer 14 will rest on the shoulder 24a with the bottom of the strainer above the bottom 20a a sufficient distance so that the whey can collect in the bottom without coming into contact with the yogurt being collected in the straining troughs 42.

It has been found in tests that the "W"-shaped construction of the inventive strainer has many advantages over other designs. A conical strainer has the advantage of simplicity of construction. Also, it has no horizontal strainer portion and it concentrates the drainage at one central point. A disadvantage of the conical strainer is that it utilizes only twenty-five percent (25%) of the cubical space to which it is tangent, thus, seventy-five percent (75%) of the usable space is wasted. The side walls, which by definition cannot approach being vertical, are placed at a relatively inefficient angle of 40° to the vertical.

Another less efficient configuration is an elongated, V-shaped strainer which can have the identical cross section as a cone, yet by definition, it wastes fifty percent (50%) of the usable, cubic space to which it is tangent. The flow of whey is still directed toward a drainage-efficient pointed-bottom edge.

The preferred embodiment illustrated herein is an elongated, "W"-shaped cross section strainer device. This design improves the placement of the side walls allowing them to be as vertical as manufacturing requirements permit, and no more than at an angle of 15° with respect to the vertical. As a result, the proposed design wastes minimal space while having superior drainage results. Drainage is now directed toward two more or less pointed bottom edges. The proposed "W"-shaped strainer volume occupies eighty percent (80%) of the square space to which it is tangent. It can readily be extended to any length to increase its capacity. Thus, it will efficiently occupy the space within a refrigerator with a minimum amount of wasted space.

Figure 10:
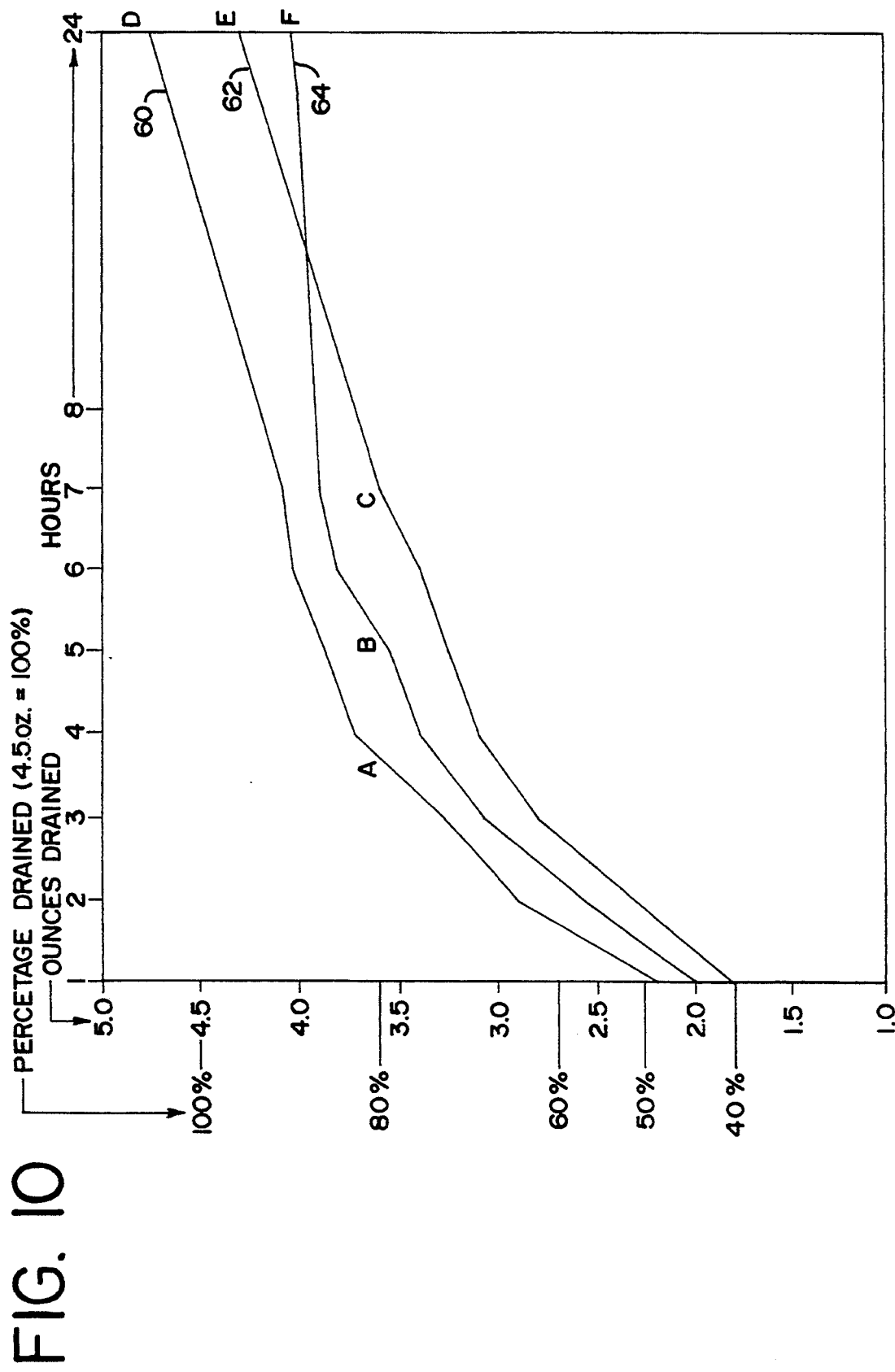
FIG. 10 is a graph comparing the inventive strainer to two alternative designs.

FIG. 10 shows a comparison between the inventive device and two other strainers available in the marketplace. The inventive device is shown as line 60. Line 62 shows the curve of the strainer sold by Progressive International Corporation located in Seattle, Wash. The strainer is a frustum which is the part of the cone next to the base that is formed by cutting off the top of the cone by a plane parallel to the base. The line shown as 64 is representative of the Really Creamy filter sold by Millhopper Marketing, Inc. located in Gainesville, Ga., and is representative of the patented device shown in U.S. Pat. No. 4,680,117. It should be noted that the inventive design drains about twice as fast as the device shown as line 62. After three and three quarters hours, drainage with the inventive product was eighty percent (80%) complete while the Progressive strainer needed seven hours to drain the same amount of whey. The device shown as the Really Creamy strainer as line 64 required over five hours to drain eighty percent (80%) of the whey. All tests were conducted with eight ounces of Dannon non-fat yogurt.

In further tests of the inventive strainer against both the Progressive International and Really Creamy devices and, further, in comparison to a strainer similar to the inventive except using a singular U-shaped cross section instead of a "W"-shaped cross section, the following results are tabulated:

TABLE 1

The following chart illustrates the time required to separate 3.6 ounces of whey from the yogurt:

| Strainer | Drainage Time/ hrs:mins | Difference/ hrs:mins: | Difference/ Relative |
|---|---|---|---|
| "W"-section | 3:45 | — | — |
| "U"-section | 6:00 | +2:15 | 1.6 times longer |
| Really Creamy | 5:12 | +1:27 | 1.4 times longer |
| Progressive International | 7:00 | +3:15 | 3.7 times longer |

TABLE 2

The following chart shows the average amount of whey drained from 8 ounces of non-fat yogurt in a twenty-four (24) hour period:

| Strainer | Drainage/ Ounces | Difference/ Ounces | Difference/ Relative |
|---|---|---|---|
| "W"-section | 4.75 | — | 100% |
| "U"-section | 4.55 | −.2 | 96% |
| Really Creamy | 4.05 | −.7 | 85% |
| Progressive International | 4.30 | −.45 | 91% |

As can be seen from the above, the inventive yogurt cheese maker incorporating the "W" cross section separated 3.6 ounces of whey considerably faster than any other strainer tested. Furthermore, the inventive device separated significantly more whey after twenty four (24) hours of drainage than the other strainers tested.

Thus, it is apparent that there has been provided a yogurt cheese maker which separates the whey from yogurt that fully satisfies the aims, objects and advantages set forth above. It is evident that many alternatives, modifications and variations will be apparent to those skilled in the art. Accordingly, it is intended to embrace such variations as fall within the spirit and scope of the appended claims.

What is claimed is:

1. A yogurt cheese device for separating the whey from yogurt comprising:
   a strainer having an open top, a bottom, a pair of opposing side walls and a pair of opposing end walls, the bottom having at least two parallel straining troughs, each straining trough having one side connected to one of the side walls and the other side connected to the other straining trough, the straining troughs and side walls formed from a mesh made of filaments, the filaments on the side walls oriented at an angle of substantially forty-five degrees with respect to the vertical;
   an outer sealable container having an open top, four side walls having top and bottom ends, and a bottom, the outer sealable container adapted to receive the strainer within it;
   a cover adapted to be received in sealing engagement by the top ends of the four side walls;
   support means in the container to hold the bottom of the strainer above the bottom of the sealable container at a predetermined height;
   whereby yogurt is placed in the strainer which is placed in the outer sealable container, the cover is placed over the sealable container top, the whey passes through the pair of troughs and is retained in the bottom of the container, with the yogurt cheese being collected in the strainer.

2. The device of claim 1 wherein the straining troughs define a "W"-shaped cross section when taken perpendicularly through the side walls.

3. The device of claim 1 wherein the mesh is made of stainless steel.

4. The device of claim 1 wherein the mesh is made of nylon.

5. The device of claim 1 wherein the pair of opposing side walls are at an angle of no more than 15° with respect to the vertical.

6. The device of claim 1 wherein the open top of the strainer and sealable container are rectangular in shape.

7. The device of claim 1 wherein the one side of each straining trough is contiguous and integral with the side wall to which it is connected.

8. The device of claim 1 wherein the support means is a shelf molded into the container which receives and supports a ledge on the strainer to hold the strainer at a predetermined height within the container.

9. The device of claim 1 wherein the opposing side walls and opposing end walls are molded out of plastic with the mesh partially embedded in the molded plastic.

10. A yogurt cheese device for separating the whey from yogurt comprising:
    a strainer for receiving the yogurt, the strainer defined by a one-piece frame, the frame having a pair of opposing end walls, top portions of a pair of opposing side walls, and a top ledge;
    a straining medium having its ends embedded into the frame, the straining medium extending from the top portions of the pair of opposing side walls to the bottom of the strainer, and then each side curving upward towards the center of the strainer where the straining medium from each side joins at an apex, the straining medium defining a pair of parallel straining troughs at the bottom of the strainer, the straining medium made from a wire cloth of square weave design, the wire cloth oriented at an angle of substantially 45° with respect to the vertical;
    an outer sealable container having an open top, four side walls having tops and bottom ends and a closed bottom, the outer sealable container adapted to receive the strainer within it;
    a cover adapted to be received in sealing engagement by the top ends of the four side walls;
    support means in the container to hold the bottom of the strainer above the bottom of the sealable container at a predetermined height;
    whereby yogurt is placed in the strainer which is placed in the outer sealable container, the cover is placed over the sealable container top, the whey passes through the pair of troughs and is retained in the bottom of the container, with the yogurt being collected in the strainer.

11. The device of claim 10 wherein the straining troughs define a "W"-shaped cross section when taken perpendicularly through the side walls.

12. The device of claim 10 wherein the mesh is made of stainless steel.

13. The device of claim 10 wherein the mesh is made of nylon.

14. The device of claim 10 wherein the pair of opposing side walls are at an angle of no more than 15° with respect to the vertical.

15. The device of claim 10 wherein the open top of the strainer and sealable container are rectangular in shape.

16. The device of claim 10 wherein the support means is a shelf molded into the container which receives and supports a ledge on the strainer to hold the strainer at a predetermined height within the container.

17. The device of claim 10 wherein the opposing side walls and opposing end walls are molded out of plastic with the mesh partially embedded in the molded plastic.

* * * * *